United States Patent [19]

Cameron

[11] 3,858,606

[45] Jan. 7, 1975

[54] SAFETY CONTROL VALVE SYSTEM FOR FLUID ACTUATED DEVICES

[75] Inventor: Russell J. Cameron, Detroit, Mich.

[73] Assignee: Ross Operating Valve Company, Detroit, Mich.

[22] Filed: Aug. 23, 1973

[21] Appl. No.: 390,883

[52] U.S. Cl................... 137/596.16, 137/625.64
[51] Int. Cl.................. F15b 13/043, F16k 31/42
[58] Field of Search............... 91/444, 448, 450; 137/596.14, 596.15, 596.16, 596.18, 625.64, 625.6

[56] References Cited
UNITED STATES PATENTS

| | | | |
|---|---|---|---|
| 3,347,259 | 10/1967 | Lansky et al. | 137/625.64 |
| 3,677,298 | 7/1972 | Greenwood et al. | 137/625.64 |
| 3,757,818 | 9/1973 | Sweet | 137/596.16 |

*Primary Examiner*—Alan Cohan
*Assistant Examiner*—Gerald A. Michalsky
*Attorney, Agent, or Firm*—Harness, Dickey & Pierce

[57] ABSTRACT

A safety control valve system for fluid actuated devices comprising two fluid-motor operated main valve means, each of which has supply and exhaust valve members, at least one of said main valve means being normally open, that is, having its supply valve member open and its exhaust valve member closed when said valve means is de-activated. Means connects the supply valve members of the two valve means in series between supply and outlet ports and the exhaust valve members in parallel between the outlet and exhaust ports. A normally closed pilot valve is provided for the normally closed valve means, if any, and a normally open pilot valve or valves for the normally open valve means. Movement of either valve means to its exhaust position will therefore completely stop the supply of pressurized fluid to the outlet port and provide a direct exhaust connection with good exhausting capacity, even if the other valve means is stuck in an open or partially open position.

2 Claims, 3 Drawing Figures

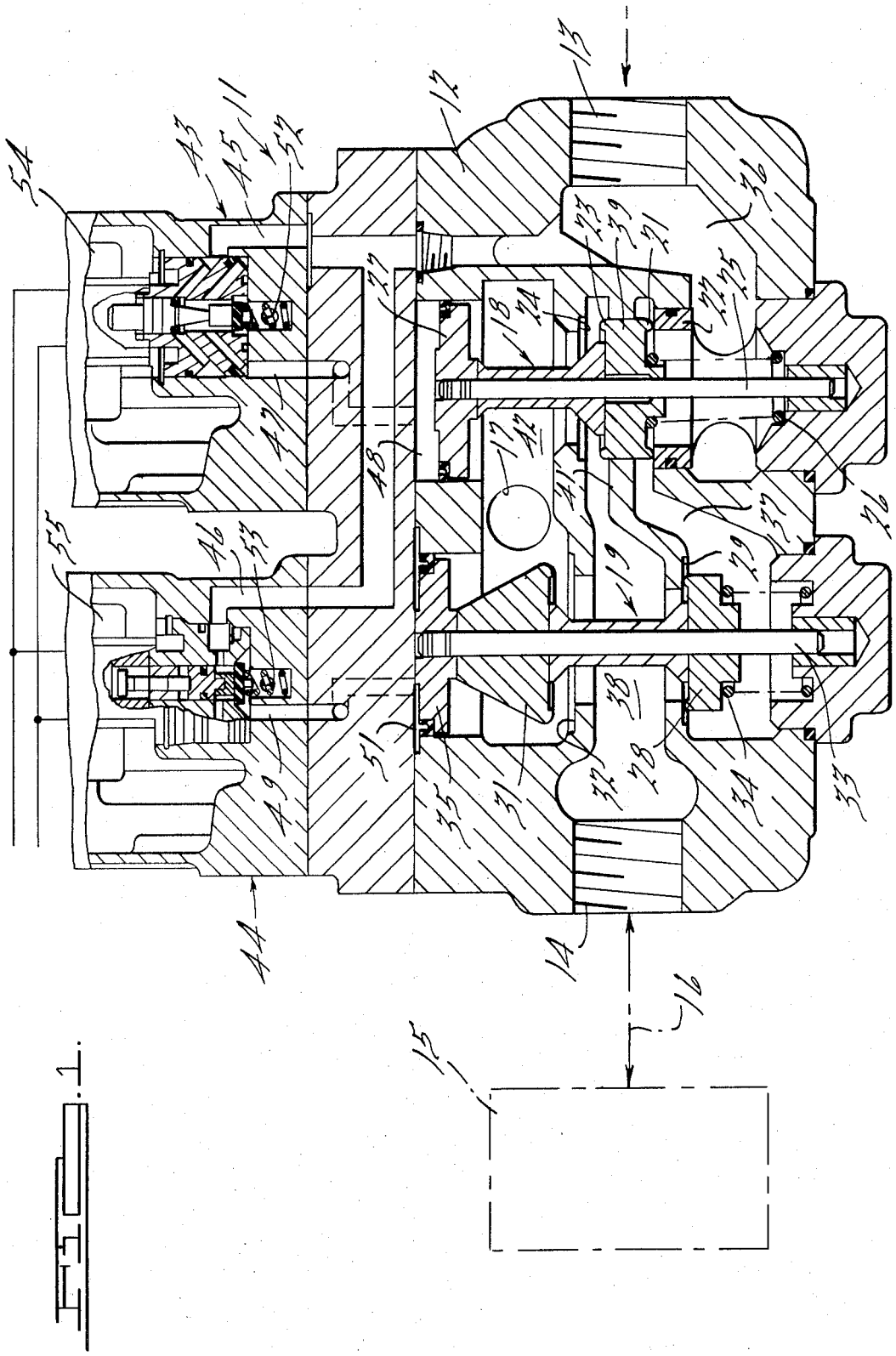

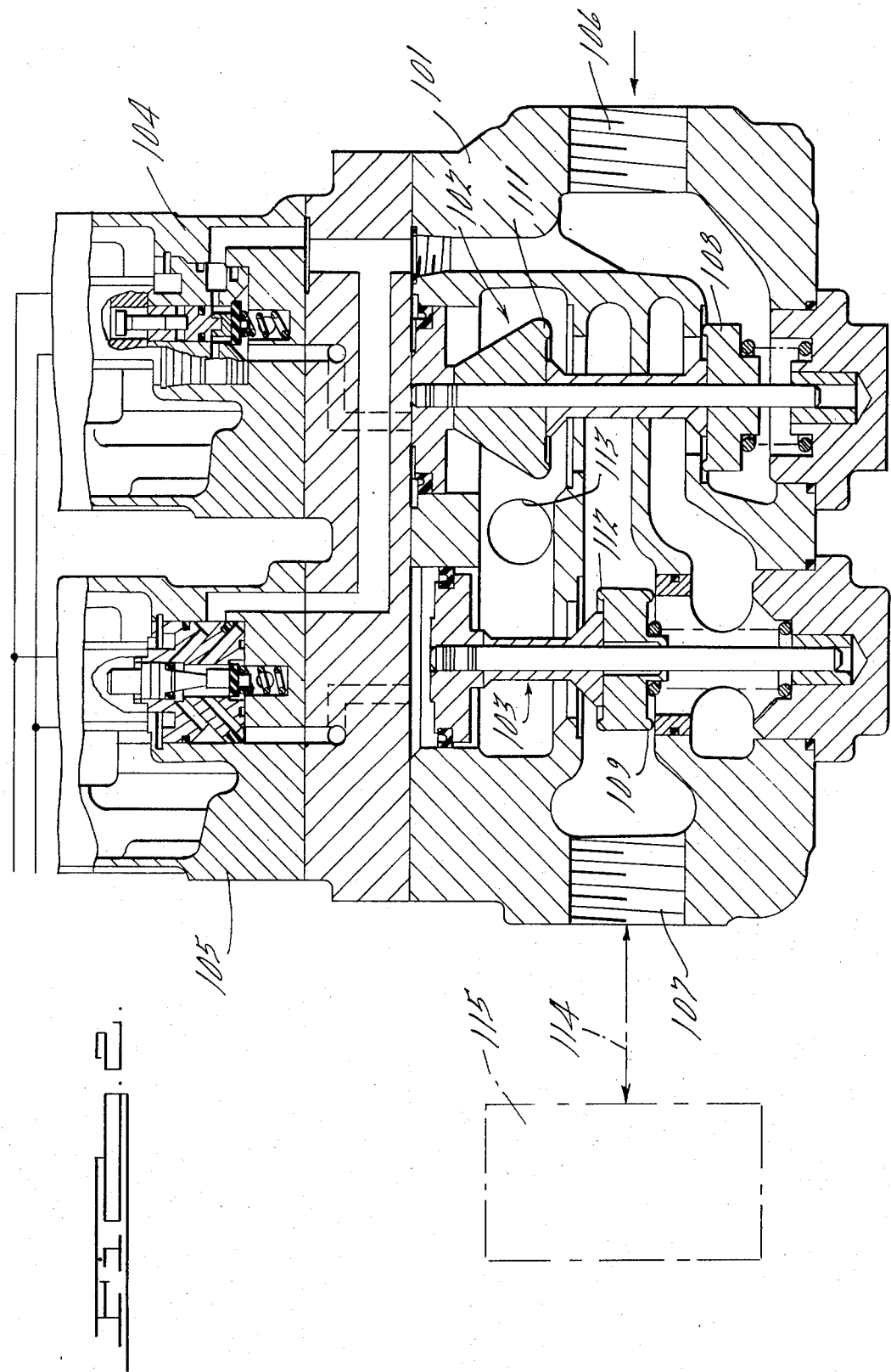

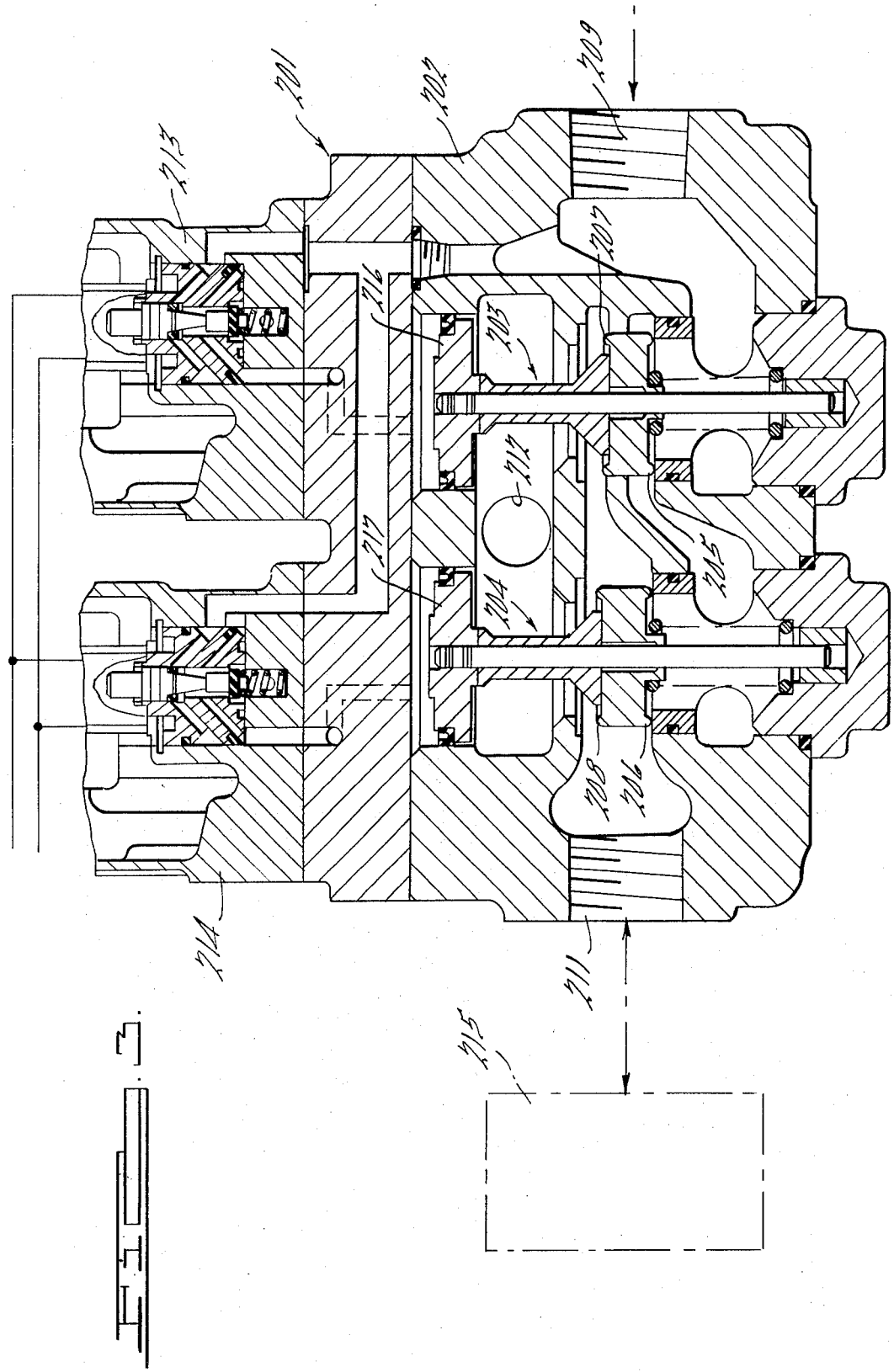

3,858,606

SAFETY CONTROL VALVE SYSTEM FOR FLUID ACTUATED DEVICES

BACKGROUND OF THE INVENTION

1. Field of the Invention

The invention relates to valves for the control of pressurized fluid to a clutch and brake line in a power press. Conventionally, pressurizing of this line with compressed air engages the clutch to actuate the press, whereas exhausting of the line de-activates in clutch and energizes the brake to stop the press.

2. Description of the Prior Art

Safety control valve systems have been developed for insuring prompt stopping of the press in the event of sticking or similar failure of the control valve means. The systems most pertinent to the present invention are exemplified by Mahorney U.S. Pat. No. 3,670,767 issued June 20, 1972 and Sweet Application No. 165,967 filed July 26, 1971, now U. S. Pat. No. 3,757,818 issued Sept. 11, 1973. In this type of arrangement, there are two fluid-motor operated main valve means each with supply and exhaust valve members, with both main vlave means being normally closed, that is, having their supply valve members closed and their exhaust valve members open when the valve means is de-activated. Means are provided connecting the two supply valve members in series between the supply and outlet ports and the two exhaust valve members in parallel between the outlet and exhaust ports. Normally closed pilot valves are provided for the normally closed valve means.

BRIEF SUMMARY OF THE INVENTION

It is an object of the present invention to provide a novel and improved safety control valve system of this nature which by its inherent nature will tend to exhaust the outlet port, and therefore stop the press, more quickly than said previously known safety control valve systems, while still incorporating the safety advantages of said previous systems, particularly in providing a direct exhaust connection regardless of which valve means is stuck.

It is another object to provide an improved safety system of this nature which is capable of obtaining relatively high exhausting capacity without the necessity of designing the parts in such large dimensions that their movement is slowed.

Briefly, each illustrated embodiment of the invention comprises two fluid-motor operated main valve means, each of which has supply and exhaust valve members, at least one of said main valve means being normally open, that is, having its supply member open and its exhaust member closed when said valve means is de-activated. Means connects the supply valve members of the two valve means in series between supply and outlet ports and the exhaust valve members in parallel between outlet and exhaust ports. A normally closed pilot valve is provided for the normally closed valve means, if any, and a normally open pilot valve for each normally open valve means. Movement of either valve means to its exhaust position will therefore completely stop the supply of air to the outlet port and provide a direct exhaust connection with good exhausting capacity, even if the other valve means is stuck in an open or partially open position.

Because of the fact that at least one main valve means will be driven with constant fluid pressure to its exhaust position rather than shifted to exhaust by the gradual decay of pressure plus the urging of a spring, it will shift more quickly, thus connecting the outlet port to exhaust and stopping the press with greater rapidity.

Three embodiments of the invention are shown, the first having a normally open main valve means followed by a normally closed main valve means in a direction from the inlet port to the outlet port, a second embodiment in which a noramally closed main valve means is followed by a normally open main valve means and a third in which both main valve means are normally open. In all embodiments, each normally open valve means is associated with a normally open pilot valve and each normally closed valve means with a normally closed pilot valve.

BRIEF DESCRIPTION OF THE DRAWINGS

FIG. 1 is a partially schematic cross-section view in elevation of a first embodiment of the invention in which a normally open main valve means is followed by a normally closed main valve means in a direction from the inlet to the outlet port;

FIG. 2 is a similar view of a second embodiment in which a normally closed valve means is followed by a normally open valve means; and FIG. 3 is a third embodiment in which both main valve means are normally open.

DESCRIPTION OF THE PREFERRED EMBODIMENTS

Referring first to the embodiment of FIG. 1, the assembly is generally indicated at 11 and comprises body means 12 having an inlet port 13 at one end, an outlet port 14 at the other end connected to a clutch and brake unit indicated in dot-dash lines at 15 by a conduit 16, and one or more exhaust port 17.

The assembly comprises first valve means generally indicated at 18 and second valve means generally indicated at 19 movably mounted within housing means 12. Valve means 18 comprises a supply valve member 21 engageable with a seat 22 and an exhaust valve member 23 engageable with a seat 24. These members are mounted on a rod 25 and are urged by a spring 26 to a position opening supply valve member 21 and closing exhaust valve member 23. A piston 27 is mounted on the upper end of rod 25.

Main valve means 19 comprises a supply valve member 28 engageable with a seat 29 and an exhaust valve member 31 engageable with a seat 32. These are mounted on a rod 33 with the valve means being urged by a spring 34 toward a position opening the exhaust valve member and closing the supply valve member. A piston 35 is mounted at the upper end of rod 33.

A passage 36 connects inlet port 13 (connected to a source of pressurized fluid) to the underside of seat 22 and a passage 37 connects the upper side of seat 22 with the underside of seat 29. A passage 38 connects the upper side of seat 29 to outlet port 14. Thus, supply valve members 21 and 28 are connected in series between ports 13 and 14.

Passage 38 extends to the underside of seat 32 and the underside of seat 24, being separated from passage 37 in the vicinity of valve means 18 by a portion 39 of the valve means fitting closely with a portion 41 of the housing means. Thus, a direct connection is provided from outlet port 14 to the upper sides of exhaust valve seats 24 and 32, the latter being connected to a common chamber 42 from which exhaust port 17 leads.

Since spring 26 urges valve means 18 upwardly toward a position opening supply valve member 21 and closing exhaust valve member 23, and spring 34 normally urges supply valve member 28 closed and exhaust valve member 31 open, valve means 18 may be termed a normally open valve means and valve means 19 a normally closed valve means. Solenoid operated pilot valves generally indicated at 43 and 44 are provided for valve means 18 and 19 respectively. These valves are supplied with pressurized fluid by conduits 45 and 46 respectively. Valve 43 has an outlet port 47 connected to the chamber 48 above piston 27 of valve means 18 and pilot valve 44 has an outlet port 49 connected to the chamber 51 above piston 35 of valve means 19. The pilot valves 43 and 44 also have exhaust ports 52 and 53 respectively.

With their solenoids 54 and 55 de-energized, pilot valve 43 is normally open and pilot valve 44 normally closed. That is, supply port 45 will be connected through outlet port 47 to chamber 48 of valve means 18, holding this valve means in its closed or exhaust position whereas outlet port 49 will be connected to exhaust port 53 leaving main valve means 19 in its closed position. Since the solenoids 54 and 55 are connected in parallel for simultaneous energization and de-energization, the supply valve members of both main valve means will be closed and the exhaust valve members open when the pilot valves are de-energized.

In use, energization of the solenoids will close pilot valve 43 and open pilot valve 44, causing both main valve manes to shift to their open positions and operating the clutch of unit 15. De-energization of the solenoids will return both main valve means to their closed positions, applying the brake of unit 15.

It will be observed that when the latter action takes place, main valve means 18 is driven by the pressure in chamber 48 to its closed or exhaust position. This movement will normally be faster than movement of a valve by decaying chamber pressure and urging of a spring, such as occurs with main valve means 19. Thus, application of the brake in unit 15 will be achieved with rapidity.

Should main valve means 18 become stuck in an open or partially open position, movement of main valve means 19 to its closed position will immediately cut off pressurized fluid to outlet port 14 and connect the outlet port directly to exhaust port 17. Should valve means 19 be stuck in an open or partially open position, shifting of valve means 18 to its closed position will likewise positively cut off fluid pressure to outlet port 14 and connect the outlet port directly to exhaust.

FIG. 2 shows another embodiment of the invention which is basically similar to the previous construction, having a housing 101, a first main valve means generally indicated at 102, a second main valve means generally indicated at 103, a pilot valve 104 for valve means 102 and pilot valve 105 for valve means 103. In this case, main valve means 102 is normally closed and main valve means 103 normally open. That is, the normally closed main valve means is upstream from the normally open main valve means with respect to inlet port 106 and outlet port 107. Supply valve member 108 of valve means 102 and supply valve member 109 of valve means 103 are connected in series between inlet port 106 and outlet port 107, and exhaust valve member 111 of valve means 102 and exhaust valve member 112 of valve means 103 are connected in parallel between outlet port 107 and exhaust port 113 of housing means 101.

Pilot valve 104 which controls valve means 102 is normally closed and pilot valve 105 is normally open. Thus, both main valve means will be held closed, as shown in FIG. 2, when the solenoids of both pilot valves are de-energized, exhausting conduit 114 to clutch and brake unit 115. The operation of the unit shown in FIG. 2 will be similar to that of FIG. 1 and need not be described in detail. De-energization of the pilot valve solenoids will shift the main valve means to their exhaust positions with valve means 103 being driven by pressurized flui and thus moving with rapidity. fluid FIG. 3 shows a third embodiment of the invention generally indicated at 201 having housing means 202 within which is disposed a first valve means generally indicated at 203 and a second valve means generally indicated at 204. Both of these valve means are of the normally open type, that is, when the valve means are de-activated, their supply valve members 205 and 206 will be lifted from their valve seats and exhaust valve members 207 and 208 will engage their valve seats. As before, the inlet valve members 205 and 206 are connected in series between inlet port 209 and outlet port 211, and exhaust valve members 207 and 208 are connected in parallel between outlet port 211 and exhaust port 212.

Valve means 203 is provided with a normally open solenoid operated pilot valve 213, and valve means 204 with a similar normally open pilot valve 214. Thus, when the solenoids of the pilot valves are de-energized, both main valve means will be held in closed positions as shown in FIG. 3. Upon energization of the solenoids, both main valve means will be shifted to their open positions. If sticking of one main valve means results in a discrepant position between the two main valve means, the safety system will function to apply the brake of clutch and brake unit 215 in the same manner as the previous embodiments. Regardless of which main valve means is stuck in its open or partially open position, the other main valve means will be moved to its closed or exhaust position quickly by the driving force on its piston 216 or 217.

It will be noted with respect to this embodiment that, should there be a loss in the fluid pressure supply at inlet port 209, both main valve means will return to their normally open positions. Upon reconnection of the fluid pressure supply at port 209, there could be a momentary surge of pressure past supply valve members 205 and 206 to outlet port 211 before the two main valve means are closed by pressure on the pistons. This embodiment therefore is usable where any such momentary surge of pressure will be insufficient to activate the clutch of clutch and brake unit 215.

I claim:

1. In a safety control valve system for fluid actuated devices, housing means having a supply port, an outlet port and at least one exhaust port, first and second main valve means in said housing means, each main valve means having supply and exhaust valve members and being shiftable between an open position in which its supply valve member is open and its exhaust valve member closed, and a closed position in which its exhaust valve member is open and its supply valve member is closed, means connecting the supply valve members of said first and second main valve means in series between said supply and outlet ports, means connecting the exhaust valve members of said first and second main valve means in parallel between said outlet and exhaust ports, whereby movement of either main valve means to its closed position when the other main valve means remains partially or fully in its open position will result in a complete cutoff of fluid pressure from the supply to the outlet port and a direct connection from the outlet port to the exhaust port, fluid pressure actuated means directly connected to both valve members of each main valve means for simultaneously shifting both valve members from one position to the other position, resilient means constantly urging both members of each main valve means in the opposite direction, at least one main valve means being so constructed that its fluid pressure actuated means will shift it from its open position to its closed position and its resilient means will shift it from it's closed position to its open position, and a solenoid operated pilot valve for each main valve means, each pilot valve being so constructed that it will maintain its main valve means in its closed position when the solenoid is de-energized.

2. The combination according to claim 1, the fluid actuated means of both main valve means urging them toward their closed positions.

* * * * *

UNITED STATES PATENT OFFICE
CERTIFICATE OF CORRECTION

Patent No. 3,858,606      Dated January 7, 1975

Inventor(s) Russell J. Cameron

It is certified that error appears in the above-identified patent and that said Letters Patent are hereby corrected as shown below:

Col. 1, line 11, "in" should be --the--; Col. 1, line 24, "vlave" should be --valve--. Col. 2, line 12, "noramally" should be --normally--; Col. 2, line 21, "cross-section" should be --cross-sectional--; Col. 2, line 39, "port" should be --ports--. Col. 3, line 35, "manes" should be --means--. Col. 4, line 17, "flui" should be --fluid--; same line, delete "fluid".

In the claims - Col. 6, line 6, "it's" should be --its--.

Signed and sealed this 13th day of May 1975.

(SEAL)
Attest:

RUTH C. MASON
Attesting Officer

C. MARSHALL DANN
Commissioner of Patents
and Trademarks